(12) United States Patent
Sun et al.

(10) Patent No.: US 10,513,754 B2
(45) Date of Patent: Dec. 24, 2019

(54) METHOD FOR RECOVERING THORIUM AND RARE EARTH ELEMENTS FROM RARE EARTH WASTE RESIDUES

(71) Applicant: XIAMEN INSTITUTE OF RARE EARTH MATERIALS, Xiamen, Fujian (CN)

(72) Inventors: Xiaoqi Sun, Fujian (CN); Yanliang Wang, Fujian (CN); Yamin Dong, Fujian (CN); Sen Qiu, Fujian (CN)

(73) Assignee: XIAMEN INSTITUTE OF RARE EARTH MATERIALS, Xiamen, Fujian (CN)

( * ) Notice: Subject to any disclaimer, the term of this patent is extended or adjusted under 35 U.S.C. 154(b) by 378 days.

(21) Appl. No.: 15/363,698

(22) Filed: Nov. 29, 2016

(65) Prior Publication Data

US 2017/0198373 A1     Jul. 13, 2017

(30) Foreign Application Priority Data

Jan. 12, 2016   (CN) .......................... 2016 1 0018037

(51) Int. Cl.
*C22B 60/02* (2006.01)
*C22B 3/38* (2006.01)
(Continued)

(52) U.S. Cl.
CPC ........ *C22B 60/0291* (2013.01); *C22B 3/0066* (2013.01); *C22B 7/007* (2013.01); *C22B 59/00* (2013.01)

(58) Field of Classification Search
CPC ..... C22B 59/00; C22B 60/0291; C22B 7/007; C22B 3/0066
See application file for complete search history.

(56) References Cited

U.S. PATENT DOCUMENTS 9,347,116 B2 *   5/2016   Li ....................... C22B 60/0291

FOREIGN PATENT DOCUMENTS

| CN | 103215451 B | 3/2014 |
|----|-------------|--------|
| CN | 102925681 B | 2/2015 |

OTHER PUBLICATIONS

Karve, Manjusha et al. "Solvent extraction separation of thorium(IV) from nitric acid with Cyanex 272." Indian Journal of Chemistry. vol. 45A, February pp. 406-408. (Year: 2006).*

(Continued)

*Primary Examiner* — Tima M. McGuthry-Banks
(74) *Attorney, Agent, or Firm* — Novick, Kim & Lee, PLLC; Allen Xue

(57) ABSTRACT

A method for recovering thorium and rare earth elements from rare earth waste residues includes the steps of (1) mixing rare earth waste residues with an inorganic acid and heating to obtain a stock solution containing thorium and rare earth elements; (2) extracting thorium and rare earth elements from the stock solution with an organic phase containing an extractant; (3) washing the organic phase obtained after extraction in step (2) with a washing solution to move rare earth elements into the aqueous phase and leave thorium in the organic phase; (4) back-extracting the organic phase containing thorium obtained in step (3) with a back-extraction solution to extract move thorium in the organic phase into the aqueous phase. The extractant contains alkyl phosphonic acid monoalkyl ester and dialkylphosphinic acid.

20 Claims, 1 Drawing Sheet

(51) Int. Cl.
C22B 7/00 (2006.01)
C22B 59/00 (2006.01)

(56) References Cited

OTHER PUBLICATIONS

Xianglan, Wang et al. "Extraction and stripping of rare earths using mixtures of acidic phosphorus-based reagents." Journal of Rare Earths. vol. 29 No. 5, May. pp. 413-415. (Year: 2011).*

Nasab, M. Eskandari. "Synergistic extraction of uranium(VI) and thorium(IV) with mixtures of Cyanex 272 and other organophosphorus ligands." J. Radioanl Nucl Chem. 298:1739-1747. doi: 10.1007/s10967-013-2528-5 (Year: 2013).*

Zhang, Can et al. "Yttrium extraction from chloride solution with a synergistic system of 2-ethylhexyl phosphonic acid mono-(2-ethylhexyl) exter and bis(2,4,4-trimethylpentyl) phosphinic acid." Hydrometallurgy. vol. 147-148 pp. 7-12. http://dx.doi.org/10.1016/j.hydromet.2014.04.008 (Year: 2014).*

* cited by examiner

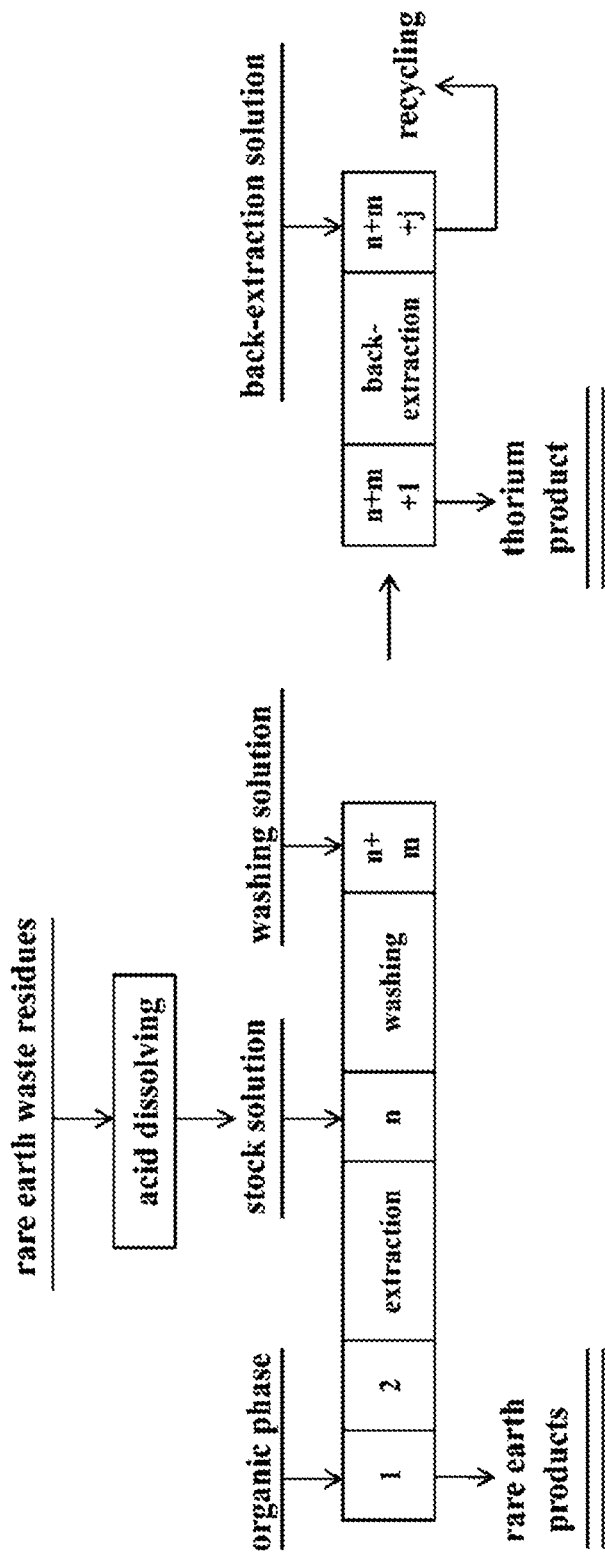

METHOD FOR RECOVERING THORIUM AND RARE EARTH ELEMENTS FROM RARE EARTH WASTE RESIDUES

TECHNICAL FIELD

The invention relates to the techniques for the extraction and the separation of rare earths, and more particularly is concerned with a method for recovering thorium and rare earth elements from rare earth waste residues.

BACKGROUND OF THE INVENTION

China has abundant rare earth resources. Rare earth ores in Baiyunebo in Baotou account for 80% of rare earth resources in China, besides bastnaesite ores, monazite ores, etc. These rare earth resources are mostly light rare earths, while ion-adsorption type rare earth ore of South China is rich in heavy rare earths. The rare earth ores are also associated with radioactive thorium, which can be brought into rare earth waste residues in the smelting process. Thus it causes not only a lot of waste of resources, but also environmental pollution.

A method for separating valuable components from monazite slag, disclosed in Chinese Patent No. CN201210489542.0, used 25-35 wt % P204 (di(2-ethylhexyl)phosphoric acid) to extract thorium from a feed solution, which was leached with sulfuric acid. After that, the solution was back-extracted with a 3.0 mol/L sodium hydroxide solution to give a solid thorium hydroxide product. Because the back-extraction process was under the strong bases environment in the method, the solubility of extractant was dramatically increased, causing a significant loss of the extractant.

A method for recovering rare earth elements from acid-soluble slag of ion-type rare earth smelting was disclosed in Chinese Patent No. CN201310052866.2. After leached with acids, rare earth elements were precipitated with oxalic acid. However, it was difficult for thorium to be effectively separated because of co-precipitation effect.

Therefore, recently a new method of extraction and separation is needed to recover high-purity thorium and rare earth elements from rare earth waste residues.

DETAILED DESCRIPTION OF THE INVENTION

An object of the present invention is to provide a method for recovering thorium and rare earth elements from rare earth waste residues with high separation factors for thorium and rare earth elements and easy back-extraction.

In order to achieve the above-mentioned object, according to one aspect of the invention, it provides a method for recovering thorium and rare earth elements from rare earth waste residues, comprising the following steps of:

(1) Mixing said rare earth waste residues with an inorganic acid and heating to obtain a stock solution containing thorium and rare earth elements;

(2) Extracting thorium and rare earth elements from said stock solution with an organic phase containing an extractant;

(3) Washing the organic phase obtained after the extraction in step (2) with a washing solution to move rare earth elements into the aqueous phase and remain thorium in the organic phase;

(4) Back-extracting the organic phase containing thorium obtained in step (3) with a back-extraction solution to move thorium from the organic phase into the aqueous phase;

Said extractant is a mixed extractant of one or more alkyl phosphonic acid monoalkyl esters of formula (I) and one or more dialkylphosphinic acids of formula (II):

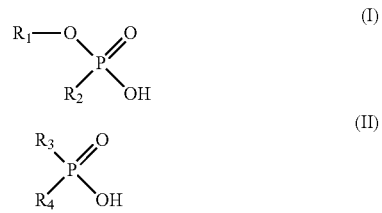

Wherein, $R_1$, $R_2$, $R_3$ and $R_4$ may be the same or different, and are each independently selected from alkyl group.

Furthermore, in formula (I), $R_1$ and $R_2$ may be the same or different, and are each independently selected from the groups consisting of $C_3$-$C_{20}$ linear or branched alkyl; preferably $C_3$-$C_{20}$ branched alkyl; more preferably $C_6$-$C_{12}$ branched alkyl; most preferably $C_6$-$C_{10}$ branched alkyl; for example, 2,4,4-trimethylpentyl, 2,2,4-trimethylpentyl, 2,3,4-trimethylpentyl, 1,1,3,3-tetramethylbutyl, or 2-ethylhexyl. Most preferably, $R_1$ and $R_2$ are the same.

Moreover, in formula (II), $R_3$ and $R_4$ may be the same or different, and are each independently selected from the groups consisting of $C_3$-$C_{20}$ linear or branched alkyl; preferably $C_3$-$C_{20}$ branched alkyl; more preferably $C_6$-$C_{12}$ branched alkyl; most preferably $C_6$-$C_{10}$ branched alkyl; for example, 2,4,4-trimethylpentyl, 2,2,4-trimethylpentyl, 2,3,4-trimethylpentyl, 1,1,3,3-tetramethylbutyl, or 2-ethylhexyl. Most preferably, $R_3$ and $R_4$ are the same; further preferably, $R_1$, $R_2$, $R_3$ and $R_4$ are the same.

Furthermore, in said mixed extractant, the volume percentages of said alkyl phosphonic acid monoalkyl ester and dialkylphosphinic acid are 30-90 vol % and 10-70 vol %, respectively, preferably 40-80 vol % and 20-60 vol %, more preferably 40-60 vol % and 40-60 vol %, for instance, can be 60 vol % and 40 vol %, or 50 vol % and 50 vol %, or 40 vol % and 60 vol %.

Furthermore, the organic phase in said step (2) further contains a phase modifier and a diluent. Preferably, in said organic phase, the volume percentages of said extractant, said phase modifier and said diluent are 1-40 vol %, 5-30 vol %, 55-94 vol %, respectively.

Preferably, said phase modifier is one or more selected from n-octanol, iso-octyl alcohol, sec-octyl alcohol, tributyl phosphate (TBP) and dimethylheptyl methylphosphate (P350).

Preferably, said diluent is one or more selected from alkanes and aromatic hydrocarbons. More preferably, said diluent is one or more selected from n-heptane, aviation kerosene, toluene, xylene, 260$^\#$ SOLVENT OIL and sulfonated kerosene.

According to the present invention, in the organic phase in step (2), said extractant can be a mixed extractant of 2,4,4-trimethylpentyl phosphonic acid 2,4,4-trimethylpentyl ester and bis(2,4,4-trimethylpentyl) phosphinic acid, said phase modifier can be iso-octyl alcohol, said diluent can be sulfonated kerosene, and the volume percentages of the three components can be, for example, 10 vol %, 20 vol % and 70 vol %; or Said extractant can be a mixed extractant of 2,2,4-trimethylpentyl phosphonic acid 2,2,4-trimethylpentyl ester and bis (2,2,4-trimethylpentyl) phosphinic acid, said phase modifier can be TBP, said diluent can be xylene, and the volume percentages of the three components can be, for example, 20 vol %, 20 vol % and 60 vol %; or Said extractant can be a mixed extractant of 2,3,4-trimethylpentyl phosphonic acid 2,3,4-trimethylpentyl ester and bis (2,3,4-trimethylpentyl) phosphinic acid, said phase modifier can be secoctyl alcohol, said diluent can be 260# SOLVENT OIL, and the volume percentages of the three components can be, for example, 10 vol %, 20 vol % and 70 vol %.

According to the present invention, the volume ratio of organic phase to stock solution in step (2) is 0.1-2:1, preferably 0.5-1:1. For example, it can be 0.67:1, or 0.5:1, or 0.8:1.

According to the present invention, in step (1), the concentration of said inorganic acid is 10-18 mol/L; optionally, said inorganic acid is one or more selected from hydrochloric acid, nitric acid and sulfuric acid; preferably hydrochloric acid and nitric acid; more preferably hydrochloric acid; optionally, the concentration of said hydrochloric acid can be 10-12 mol/L, the concentration of said nitric acid can be 14-16 mol/L, and the concentration of said sulfuric acid can be 15-18 mol/L.

Optionally, the ratio of the mass (kg) of said rare earth waste residues to the volume (L) of inorganic acid is 1:1-8; preferably 1:1-6, more preferably 1:1-4; for example, the ratio of the mass of said rare earth waste residues to the volume of inorganic acid can be 1:3 or 1:1.

According to the present invention, said stock solution in step (1) is obtained by mixing said rare earth waste residues with hydrochloric acid, heating, leaching and then diluting, wherein the total concentration of rare earth elements can be 0.35 mol/L, the concentration of free hydrochloric acid can be 0.30 mol/L, and the molar ratio of thorium to total rare earth elements can be 1:10; or Said stock solution in step (1) is obtained by mixing said rare earth waste residues with sulfuric acid, heating, leaching and then diluting, wherein the total concentration of rare earth elements can be 0.15 mol/L, the concentration of free sulfuric acid can be 0.50 mol/L, and the molar ratio of thorium to total rare earth elements can be 1:2.6; or Said stock solution in step (1) is obtained by mixing said rare earth waste residues with nitric acid, heating, leaching and then diluting, wherein the total concentration of rare earth elements can be 0.25 mol/L, the concentration of free nitric acid can be 0.40 mol/L, and the molar ratio of thorium to total rare earth elements can be 1:4.

According to the present invention, in step (3), said washing solution is preferably selected from hydrochloric acid, nitric acid or sulfuric acid with the concentration of 0.1-1.0 mol/L; the concentration of said washing solution is preferably 0.3-0.5 mol/L; specifically, said washing solution can be, for example, 0.5 mol/L hydrochloric acid, or 0.3 mol/L sulfuric acid, or 0.5 mol/L nitric acid.

Preferably, in step (3), the volume ratio of said washing solution to said stock solution in step (1) is 0.1-1:1, preferably 0.15-0.8:1. For example, it can be 0.25:1, or 0.2:1, or 0.5:1.

According to the present invention, in step (4), said back-extraction solution is hydrochloric acid, nitric acid or sulfuric acid with the concentration of 2.0-6.0 mol/L; the concentration of said back-extraction solution is preferably 3.0-6.0 mol/L; for example, said back-extraction solution can be 6.0 mol/L hydrochloric acid, or 3.0 mol/L sulfuric acid, or 6.0 mol/L nitric acid.

Preferably, in step (4), the volume ratio of said back-extraction solution to said stock solution in step (1) is 0.1-2:1, preferably 0.2-1:1. For example, it can be 0.67:1 or 0.5:1.

According to the present invention, said temperature for the extraction and the back-extraction is preferably 20° C.-35° C., more preferably 23° C.-30° C.; and said extraction time is preferably 5-10 minutes.

According to the present invention, the entire extraction processes of the above-described method are carried out in mixer settlers, containing n-stage extraction, m-stage washing and j-stage back-extraction, wherein n=4-6, m=5-8 and j=4-6.

Preferably, the organic phase is introduced at the $1^{th}$ stage, the stock solution is introduced at the $n^{th}$ stage, the washing solution is introduced at the $(n+m)^{th}$ stage, and the back-extraction solution is introduced at the $(n+m+j)^{th}$ stage.

Compared with the prior art, the present invention provides a method for recovering thorium and rare earth elements from rare earth waste residues. Because a mixture of alkyl phosphonic acid monoalkyl ester and dialkylphosphinic acid is used as an extractant, the extractant has a relatively good synergic extraction effect, taking into account not only the separation selectivity in the extraction, but also the performance of the back-extraction. Thus the method has high extraction efficiency, the feature and function to be easily back-extracted and high thorium selectivity. When the extractant and the extraction method of the present invention are used, the thorium purity in the aqueous phase after the extraction and separation can be achieved to more than 99.9% and the content of thorium in the rare earth decreases to less than 0.02%, which means the selectivity of extraction and separation is very good. In addition, due to avoiding using strong bases as a back-extractant, the extractant can significantly save the consumption of acid and alkali in the extracting process. The method provided by the invention for extraction and separation, shows good interfacial phenomenon in the process of extraction; the concentration of the organic phase does not obviously change; the organic phase can be recycled without saponification; and no ammonia-nitrogen wastewater is produced in the process of extraction. Consequently, the present invention provides a clean and efficient process for recovering thorium and rare earth elements.

DESCRIPTION OF THE DRAWING

FIG. 1 is a schematic diagram showing a process for recovering thorium and rare earth elements from rare earth waste residues in accordance with the present invention.

DETAILED DESCRIPTION OF VARIOUS EXAMPLES

Hereinafter, the present invention will be detailedly illustrated with reference to the embodiments and appended drawings. However, it should be understood by those skilled in the art that these embodiments are not a limitation to the protection scope of the present invention. According to the disclosure of the present invention, those skilled in the art should recognize that many changes and modifications based on said embodiments belong to the protection scope of the present invention without departing from the technical features and scope given by the technical solution of the present invention. Materials used in the following embodiments, unless otherwise specified, are commercially available for the purchase of products.

As the above described, which shown in FIG. 1, the invention provides a method for recovering thorium and rare earth elements from rare earth waste residues, comprising the following steps of: (1) mixing rare earth waste residues with an inorganic acid and heating to obtain a stock solution containing thorium and rare earth elements; (2) extracting thorium and rare earth elements from said stock solution with an organic phase containing an extractant; (3) washing the organic phase obtained after the extraction in step (2) with a washing solution to move rare earth elements into the aqueous phase and remain thorium in the organic phase; (4) back-extracting the organic phase containing thorium obtained in step (3) with a back-extraction solution to move thorium from the organic phase into the aqueous phase; the extractant in the process of extraction is a mixed extractant of one or more alkyl phosphonic acid monoalkyl esters of formula (I) and one or more dialkylphosphinic acids of formula (II).

In the present invention, the source of rare earth waste residues is not limited, which can be slag of rare earth ore in Baiyunebo in Baotou, slag of monazite ore, acid-soluble slag of bastnasite ore, and neutralized slag of ion-adsorption type rare earth ore smelting of South China. Generally, the content of thorium in rare earth waste residues is 0.01-20 wt %. The mixed mode of rare earth water residues and an inorganic acid is not particularly limited, which is widely recognized and well known to those skilled in the art.

According to the present invention, the inorganic acid in said step (1) is preferably selected from hydrochloric acid, nitric acid or sulfuric acid; more preferably hydrochloric acid or nitric acid; most preferably hydrochloric acid. The concentration of said inorganic acid is 10-18 mol/L, especially the concentration of said hydrochloric acid is preferably 10-12 mol/L, the concentration of said nitric acid is preferably 14-16 mol/L, and the concentration of said sulfuric acid is preferably 15-18 mol/L. In the invention, the concentration of the inorganic acid is limited within the above-mentioned range, mainly on account of the higher activity of the inorganic acid, the better dissolution effect of rare earth waste residues.

In order to improve production efficiency, the ratio of the mass (kg) of said rare earth waste residues to the volume (L) of inorganic acid in the present invention is preferably controlled in the range of 1:1-8. More preferably 1:1-6, the most preferably 1:1-4. For example, the ratio of the mass of said rare earth waste residues to the volume of inorganic acid can be 1:3 or 1:1.

According to the present invention, rare earth waste residues are mixed with inorganic acid, and then generally heated to 60-150° C. and leaching for 0.5-3 hours. After the solution is diluted, a stock solution containing thorium and rare earth elements is obtained. In said stock solution, the total concentration of rare earth elements can be, for example, 0.1-0.5 mol/L, preferably 0.15-0.35 mol/L; the concentration of free acid can be 0.1-1.0 mol/L, preferably 0.3-0.5 mol/L; the molar ratio of thorium to total rare earth elements can be 1:1-1:15, preferably 1:2-1:10.

According to the present invention, after the stock solution is obtained, thorium and rare earth elements in the stock solution are extracted by an organic phase containing an extractant. The invention adopts a mixed extractant of alkyl phosphonic acid monoalkyl ester and dialkylphosphinic acid as an extractant, mainly on account of high extraction efficiency of the mixed extractant, and easy back-extraction. And because of avoiding using strong bases as a back-extractant, the loss of the extractant is reduced, and meanwhile the consumption of acid is significantly saved.

The source of alkyl phosphonic acid monoalkyl ester of formula (I) of the invention is not limited, which can be commercially available, and can also be home-made. Or it can be prepared by the following method:

1) Adding the alcohol $R_1OH$ in a reaction vessel, stirring at 10-30° C., and adding dropwise phosphorus trichloride for one hour. Heating to 60° C. and stirring for half an hour, and then distilling alkyl chloride under reduced pressure to give a crude phosphonous diester $(R_1O)_2POH$;

2) Adding the product of crude phosphonous diester obtained in step 1) in a reaction vessel, adding sodium ethoxide, and distilling ethanol under reduced pressure. And then adding the corresponding alkyl chloride $R_2Cl$, heating to reflux for 5 hours, adding water to layer, recycling alkyl chloride when the oil layer is under reduced pressure to give a neutral ester

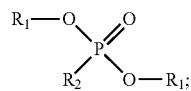

3) Adding the neutral ester obtained in step 2) in a reaction vessel, adding hydrochloric acid, heating to reflux for 10 hours, after cooling extracting and purifying the product with petroleum ether to give alkyl phosphonic acid monoalkyl ester

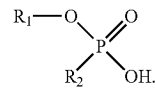

Wherein, the mass ratios of said alcohol $R_1OH$, phosphine trichloride and alkyl chloride $R_2Cl$ are preferably (90-100):(30-40):(105-115); the volume percent of said sodium ethoxide is preferably 20-25 vol %; the volume percent of said hydrochloric acid is 15-25 vol %.

According to the present invention, the source of dialkylphosphinic acid is not limited, which can be a commercially available product, or prepared preferably according to the high-pressure addition reaction method of PH3, or according to the addition method of sodium hypophosphite, or according to the method of Grignard reagent disclosed in Rare Earth Solvent Extraction written by Xu Guangxian and Yuan Chengye.

According to the present invention, in the mixed extractant, the volume percentages of said alkyl phosphonic acid monoalkyl ester and dialkylphosphinic acid are 30-90 vol % and 10-70 vol %, respectively, preferably 40-80 vol % and 20-60 vol %, more preferably 40-60 vol % and 40-60 vol %, for instance, can be 60 vol % and 40 vol %, or 50 vol % and 50 vol %, or 40 vol % and 60 vol %. The volume percentages of the two extractants are limited within the above-mentioned range, mainly being considered that the mixed extractant of alkyl phosphonic acid monoalkyl ester and dialkylphosphinic acid has an obvious synergic extraction effect, enhancing not only the separation selectivity in the extraction, but also the performance of the back-extraction. If the amount of the extractant of alkyl phosphonic acid monoalkyl ester is excessively added, it can occur problems, such as difficulty for back-extraction, interfacial emulsification, etc. In contrast, if the amount of the extractant of dialkylphosphinic acid is excessively added, it can occur problems, such as low extraction efficiency of thorium and rare earth elements, low yields of rare earth elements, etc. Therefore, comprehensively considered, the volume percentages of the two extractants are limited within the above-mentioned range.

The present invention provides a mixed extractant comprising alkyl phosphonic acid monoalkyl ester and dialkylphosphinic acid used as an organic phase for the extraction. In a preferred mode for carrying out the invention, the organic phase comprised the mixed extractant, a phase modifier and a diluent can also be used for extracting. According to the present invention, the aim of the addition of phase modifier is to improve the interfacial phenomena during the extraction, to accelerate phase separation rate, and to avoid the formation of solid extracted complexes; the aim of the addition of diluent is to reduce the viscosity of the extractant, and to increase the effective loading capacity of the organic phase. The addition of phase modifier and diluent is advantageous to decrease phase separation time, so that the extraction process can run smoothly. Preferably, the volume percentages of said mixed extractant, said phase modifier and said diluent are 1-40 vol %, 5-30 vol %, and 55-94 vol %, respectively. The invention is further limited three volume percentages, mainly being considered that the ratios within the above-described range can be better for the efficient extraction and the separation of thorium and rare earth elements; otherwise it can affect the separation of thorium and rare earth elements, further affect both purity and yield of the product.

According to the present invention, after the stock solution is extracted by the organic phase, thorium and rare earth elements move into the organic phase. After that, the organic phase after extraction is washed with a washing solution, thus rare earth elements move into the aqueous phase and thorium remains in the organic phase. The washing solution of the invention can be hydrochloric acid, nitric acid or sulfuric acid. The concentration of said washing solution can be 0.1-1.0 mol/L. The concentration range of the washing solution is considered to be more effective washing rare earth elements from the organic phase to the aqueous phase, otherwise, both of thorium and rare earth elements move into the aqueous phase with a high concentration of the washing solution, or rare earth elements cannot be washed into the aqueous phase with a low concentration of the washing solution, which are unfavorable for extraction. Preferably, the concentration of the washing solution can be 0.3-0.5 mol/L. For example, the washing solution can be 0.5 mol/L hydrochloric acid, or 0.3 mol/L sulfuric acid, or 0.5 mol/L nitric acid.

According to the present invention, after washing with the washing solution, the back-extraction process is also carried out to extract thorium remained in the organic phase with a back-extraction solution. Said back-extraction solution can be hydrochloric acid, nitric acid or sulfuric acid with the concentration of 2.0-6.0 mol/L, preferably 3.0-6.0 mol/L. For example, the back-extraction solution can be 6.0 mol/L hydrochloric acid, or 3.0 mol/L sulfuric acid, or 6.0 mol/L nitric acid.

According to the present invention, said temperature for the extraction and the back-extraction is preferably 20° C.-35° C., more preferably 23° C.-30° C.; and said extraction time is preferably 5-10 minutes. If the extraction temperature and back-extraction temperature are too high or too low, it can affect the separation of the organic phase and aqueous phase. Similarly, if the extraction time and back-extraction time are too long or too short, it can affect the separation of thorium and rare earths.

According to the present invention, the entire extraction processes of the above-described method are carried out in mixer settlers, containing n-stage extraction, m-stage washing and j-stage back-extraction, wherein n=4-6, m=5-8 and j=4-6. Preferably, the organic phase is introduced at the stage, the stock solution is introduced at the $n^{th}$ stage, the washing solution is introduced at the $(n+m)^{th}$ stage, and the back-extraction solution is introduced at the $(n+m+j)^{th}$ stage.

After the extraction process, thorium and rare earth elements in the water phase are determined by ICP-OES method with specific reference to JY/T015-1996 General Rules for Inductively Coupled Plasma Atomic Emission Spectrometry. It is found out that the extraction and separation method provided by the present invention can effectively recover and separate thorium and rare earth elements from rare earth waste residues, resulting that the thorium purity is achieved to more than 99.9% and the content of thorium in the rare earth decreases to less than 0.01%.

In order to further illustrate the present invention, hereinafter, the method for the extraction and separation of heavy rare earth elements provided by the present invention will be elucidated with reference to the specific embodiments.

Embodiment 1

1) Preparation of the stock solution:

Acid-soluble slag of ion-adsorption type rare earth ore smelting of South China (1 kg) was dissolved in hydrochloric acid at the concentration of 10 mol/L (3.0 L) with a solid/liquid ratio of 1:3, then heated to 60° C. and leached for 3 hours. After the solution was diluted, a stock solution containing thorium and rare earth elements was obtained. In said stock solution, the total concentration of rare earth elements was 0.35 mol/L, the concentration of free hydrochloric acid was 0.30 mol/L, and the molar ratio of thorium to total rare earth elements was 1:10.

2) Preparation of the organic phase: a mixed extractant was composed of 2,4,4-trimethylpentyl phosphonic acid 2,4,4-trimethylpentyl ester and bis(2,4,4-trimethylpentyl) phosphinic acid with the volume percentages of 50 vol % and 50 vol %. The organic phase comprised the mixed extractant, the iso-octyl alcohol phase modifier, and the sulfonated kerosene diluent, which were mixed based on the volume percentages of 10 vol %, 20 vol % and 70 vol %.

3) Extraction and back-extraction:

As shown in FIG. 1, the organic phase was used to extract thorium and rare earth elements from the stock solution (the volume ratio of organic phase to stock solution was 0.67:1), the washing solution was used to wash (the volume ratio of said washing solution to stock solution was 0.25:1) and the back-extraction solution was used to back-extract (the volume ratio of back-extraction solution to stock solution was 0.67:1): the fractional extraction and back-extraction processes were carried out in a 0.35 L mixer settler, and the aqueous phase and the organic phase were kept in the mixing chamber for 8 minutes. The extraction stage n was 4, the washing stage m was 5, and the back-extraction stage j was 5. The washing solution was 0.5 mol/L hydrochloric acid and the back-extraction solution was 6.0 mol/L hydrochloric acid. The organic phase without saponification was introduced at the $1^{th}$ stage. The stock solution was introduced at the $4^{th}$ stage, the washing solution was introduced at the $9^{th}$ stage, and the back-extraction solution was introduced at the $14^{th}$ stage.

After the fractional extraction and back-extraction processes were completed, thorium and rare earth elements were separated relatively well. The contents of thorium in the aqueous phase and in the rare earth were determined by ICP-OES method. It showed that the thorium purity was achieved to 99.99%, and the content of thorium in the rare earth after extraction was less than 0.01 wt %.

Embodiment 2

1) Preparation of the stock solution: slag of monazite ore (1 kg) was dissolved in sulfuric acid at the concentration of 18 mol/L (1.0 L) with a solid/liquid ratio of 1:1, then heated to 150° C. and leached for 0.5 hour. After the solution was diluted, a stock solution containing thorium and rare earth elements was obtained. In said stock solution, the total concentration of rare earth elements was 0.15 mol/L, the concentration of free sulfuric acid was 0.50 mol/L, and the molar ratio of thorium to total rare earth elements was 1:2.6.

2) Preparation of the organic phase: a mixed extractant was composed of 2,2,4-trimethylpentyl phosphonic acid 2,2,4-trimethylpentyl ester and bis(2,2,4-trimethylpentyl) phosphinic acid with the volume percentages of 40 vol % and 60 vol %. The organic phase comprised the extractant, the TBP phase modifier, the xylene diluent, and the volume percentages of the three components were 20 vol %, 20 vol % and 60 vol %.

3) Extraction and back-extraction

As shown in FIG. 1, the organic phase was used to extract thorium and rare earth elements from the stock solution (the volume ratio of organic phase to stock solution was 0.5:1), the washing solution was used to wash (the volume ratio of said washing solution to stock solution was 0.25:1) and the back-extraction solution was used to back-extract (the volume ratio of back-extraction solution to stock solution was 0.5:1): the fractional extraction and back-extraction processes were carried out in a small centrifugal extractor, and the aqueous phase and the organic phase were kept in the mixing chamber for 8 minutes. The extraction stage n was 5, the washing stage m was 5, and the back-extraction stage j was 5. The washing solution was 0.3 mol/L sulfuric acid and the back-extraction solution was 3.0 mol/L sulfuric acid. The organic phase without saponification was introduced at the $1^{th}$ stage. The stock solution was introduced at the $5^{th}$ stage, the washing solution was introduced at the $10^{th}$ stage, and the back-extraction solution was introduced at the $15^{th}$ stage.

After the fractional extraction and back-extraction processes were completed, thorium and rare earth elements were separated relatively well. The contents of thorium in the aqueous phase and in the rare earth were determined by ICP-OES method. It showed that the thorium purity was achieved to 99.95%, and the content of thorium in the rare earth after extraction was less than 0.01 wt %.

Embodiment 3

1) Preparation of the stock solution: neutralized slag of bastnasite ore (1 kg) was dissolved in concentrated nitric acid at the concentration of 14 mol/L (3.0 L) with a solid/liquid ratio of 1:3, then heated to 100° C. and leached for 2 hours. After the solution was diluted, a stock solution containing thorium and rare earth elements was obtained. In said stock solution, the total concentration of rare earth elements was 0.25 mol/L, the concentration of free nitric acid was 0.40 mol/L, and the molar ratio of thorium to total rare earth elements was 1:4.

2) Preparation of the organic phase: a mixed extractant was composed of 2,3,4-trimethylpentyl phosphonic acid 2,3,4-trimethylpentyl ester and bis(2,3,4-trimethylpentyl) phosphinic acid with the volume percentages of 50 vol % and 50 vol %. The organic phase comprised the mixed extractant, the sec-octyl alcohol phase modifier, and the 260# solvent SOLVENT OIL diluent, which were mixed based on the volume percentages of 10 vol %, 20 vol % and 70 vol %.

3) Extraction and back-extraction:

As shown in FIG. 1, the organic phase was used to extract thorium and rare earth elements from the stock solution (the volume ratio of organic phase to stock solution was 0.8:1), the washing solution was used to wash (the volume ratio of said washing solution to stock solution was 0.5:1) and the back-extraction solution was used to back-extract (the volume ratio of back-extraction solution to stock solution was 0.5:1): the fractional extraction and back-extraction processes were carried out in a 0.35 L mixer settler, and the aqueous phase and organic phase were kept in the mixing chamber for 10 minutes. The extraction stage n was 6, the washing stage m was 8, and the back-extraction stage j was 6. The washing solution was 0.5 mol/L nitric acid and the back-extraction solution was 6.0 mol/L nitric acid. The organic phase without saponification was introduced at the $1^{th}$ stage. The stock solution was introduced at the $6^{th}$ stage, the washing solution was introduced at the $14^{th}$ stage, and the back-extraction solution was introduced at the $20^{th}$ stage, After the fractional extraction and back-extraction processes were completed, thorium and rare earth elements were separated relatively well. The contents of thorium in the aqueous phase and in the rare earth were determined by ICP-OES method. It showed that the thorium purity was achieved to 99.999%, and the content of thorium in the rare earth after extraction was less than 0.01 wt %.

Embodiment 4

1) Preparation of the stock solution:

Acid-soluble slag of ion-adsorption type rare earth ore smelting of South China (1 kg) was dissolved in hydrochloric acid at the concentration of 10 mol/L (3.0 L) with a solid/liquid ratio of 1:3, then heated to 60° C. and leached for 3 hours. After the solution was diluted, a stock solution containing thorium and rare earth elements was obtained. In said stock solution, the total concentration of rare earth elements was 0.35 mol/L, the concentration of free hydrochloric acid was 0.30 mol/L, and the molar ratio of thorium to total rare earth elements was 1:10.

2) Preparation of the organic phase: a mixed extractant was composed of 2,4,4-trimethylpentyl phosphonic acid 2,2,4-trimethylpentyl ester and (2,4,4-trimethylpentyl)(2,2,4-trimethylpentyl) phosphinic acid with the volume percentages of 50 vol % and 50 vol %. The organic phase comprised the mixed extractant, the iso-octyl alcohol phase modifier, and the sulfonated kerosene diluent, which were mixed based on the volume percentages of 10 vol %, 20 vol % and 70 vol %.

3) Extraction and back-extraction

As shown in FIG. 1, the organic phase was used to extract thorium and rare earth elements from the stock solution (the volume ratio of organic phase to stock solution was 0.67:1), the washing solution was used to wash (the volume ratio of said washing solution to stock solution was 0.25:1) and the back-extraction solution was used to back-extract (the volume ratio of back-extraction solution to stock solution was 0.67:1): the fractional extraction and back-extraction processes were carried out in a 0.35 L mixer settler, and the aqueous phase and organic phase were kept in the mixing chamber for 8 minutes. The extraction stage n was 4, the washing stage m was 5, and the back-extraction stage j was 5. The washing solution was 0.5 mol/L hydrochloric acid and the back-extraction solution was 6.0 mol/L hydrochloric acid. The organic phase without saponification was introduced at the $1^{th}$ stage. The stock solution was introduced at the $4^{th}$ stage, the washing solution was introduced at the $9^{th}$ stage, and the back-extraction solution was introduced at the $14^{th}$ stage.

After the fractional extraction and back-extraction processes were completed, thorium and rare earth elements were separated relatively well. The contents of thorium in the aqueous phase and in the rare earth were determined by ICP-OES method. It showed that the thorium purity was achieved to 99.9%, and the content of thorium in the rare earth after extraction was less than 0.02 wt %.

Comparative Embodiment 1

1) Preparation of the stock solution:
Acid-soluble slag of ion-adsorption type rare earth ore smelting of South China (1 kg) was dissolved in hydrochloric acid at the concentration of 10 mol/L (3.0 L) with a solid/liquid ratio of 1:3, then heated to 60° C. and leached for 3 hours. After the solution was diluted, a stock solution containing thorium and rare earth elements was obtained. In said stock solution, the total concentration of rare earth elements was 0.35 mol/L, the concentration of free hydrochloric acid was 0.30 mol/L, and the molar ratio of thorium to total rare earth elements was 1:10.

2) Preparation of the organic phase: an extractant was 2,4,4-trimethylpentyl phosphonic acid 2,4,4-trimethylpentyl ester. The organic phase comprised the extractant, the iso-octyl alcohol phase modifier, and the sulfonated kerosene diluent, which were mixed based on the volume percentages of 10 vol %, 20 vol % and 70 vol %.

3) Extraction and back-extraction
As shown in FIG. 1, the organic phase was used to extract thorium and rare earth elements from the stock solution (the volume ratio of organic phase to stock solution was 0.67:1), the washing solution was used to wash (the volume ratio of said washing solution to stock solution was 0.25:1) and the back-extraction solution was used to back-extract (the volume ratio of back-extraction solution to stock solution was 0.67:1): the fractional extraction and back-extraction processes were carried out in a 0.35 L mixer settler, and the aqueous phase and organic phase were kept in the mixing chamber for 8 minutes. The extraction stage n was 4, the washing stage m was 5, and the back-extraction stage j was 5. The washing solution was 0.5 mol/L hydrochloric acid and the back-extraction solution was 6.0 mol/L hydrochloric acid. The organic phase without saponification was introduced at the $1^{th}$ stage. The stock solution was introduced at the $4^{th}$ stage, the washing solution was introduced at the $9^{th}$ stage, and the back-extraction solution was introduced at the $14^{th}$ stage.

After the fractional extraction and back-extraction processes were completed, thorium and rare earth elements were separated relatively well. The contents of thorium in the aqueous phase and in the rare earth were determined by ICP-OES method. It showed that the thorium purity was achieved to 80.72%, and the content of thorium in the rare earth after extraction was about 10.5 wt %.

The invention claimed is:

1. A method for recovering of thorium and rare earth elements from rare earth waste residues, comprising:
    (1) mixing rare earth waste residues with an inorganic acid and heating to obtain a stock solution containing thorium and rare earth elements;
    (2) extracting thorium and rare earth elements from the stock solution with an organic phase containing an extractant;
    (3) washing the organic phase obtained from step (2) with a washing solution to move rare earth elements into an aqueous phase, wherein thorium remains in the organic phase;
    (4) back-extracting the organic phase containing thorium obtained from step (3) with a back-extraction solution to move thorium from the organic phase into the aqueous phase, wherein the extractant is a mixture of one or more alkyl phosphonic acid monoalkyl esters of formula (I) and one or more dialkylphosphinic acids of formula (II):

wherein $R_1$, $R_2$, $R_3$, and $R_4$ are same or different alkyl groups.

2. The method of claim 1, wherein, in formula (I), $R_1$ and $R_2$ are the same or different, and are each independently a $C_3$-$C_{20}$ linear alkyl.

3. The method of claim 1, wherein the organic phase in step (2) further contains a phase modifier and a diluent.

4. The method of claim 3, wherein, in the organic phase in step (2):
    the extractant is a mixture of 2,4,4-trimethylpentyl phosphonic acid 2,4,4-trimethylpentyl ester and bis(2,4,4-trimethylpentyl) phosphinic acid, the phase modifier is iso-octyl alcohol, the diluent is sulfonated kerosene, and the volume percentages of the extractant, the iso-octyl alcohol, and the sulfonated kerosene are 10 vol %, 20 vol %, and 70 vol %, respectively;
    the extractant is a mixture of 2,2,4-trimethylpentyl phosphonic acid 2,2,4-trimethylpentyl ester and bis(2,2,4-trimethylpentyl) phosphinic acid, the phase modifier is tributyl phosphate (TBP), the diluent is xylene, and the volume percentages of the extractant, TBP, and xylene are 20 vol %, 20 vol %, and 60 vol %, respectively; or
    the extractant is a mixture of 2,3,4-trimethylpentyl phosphonic acid 2,3,4-trimethylpentyl ester and bis(2,3,4-trimethylpentyl) phosphinic acid, the phase modifier is sec-octyl alcohol and the volume percentages of the extractant, the sec-octyl alcohol, and the diluent are 10 vol %, 20 vol %, and 70 vol %, respectively.

5. The method of claim 3, wherein, in the organic phase, the volume percentages of the extractant, the phase modifier, and the diluent are 1-40 vol %, 5-30 vol %, and 55-94 vol %, respectively.

6. The method of claim 3, wherein, the phase modifier is one or more selected from the group consisting of n-octanol, iso-octyl alcohol, sec-octyl alcohol, tributyl phosphate (TBP), and dimethylheptyl methylphosphate.

7. The method of claim 3, wherein the diluent is one or more selected from the group consisting of alkanes and aromatic hydrocarbons.

8. The method of claim 1, wherein the concentration of the inorganic acid in step (1) is 10-18 mol/L, and the inorganic acid is one or more selected from the group consisting of hydrochloric acid, nitric acid, and sulfuric acid.

9. The method of claim 1, wherein, in step (1), the rare earth waste residues are mixed the with inorganic acid, and then heated to 60-150° C. and leached for 0.5-3 hours.

10. The method of claim 1, wherein, in step (1):
the stock solution is obtained by mixing the rare earth waste residues with hydrochloric acid, and then heating, leaching, and diluting, wherein, in the stock solution, the total concentration of rare earth elements is 0.35 mol/L, the concentration of free hydrochloric acid is 0.30 mol/L, and the molar ratio of thorium to total rare earth elements is 1:10;
the stock solution is obtained by mixing the rare earth waste residues with sulfuric acid, then heating, leaching, and diluting, wherein, in the stock solution, the total concentration of rare earth elements is 0.15 mol/L, the concentration of free sulfuric acid is 0.50 mol/L, and the molar ratio of thorium to total rare earth elements is 1:2.6;
or
the stock solution is obtained by mixing the rare earth waste residues with nitric acid, then heating, leaching, and diluting, wherein, in the stock solution, the total concentration of rare earth elements is 0.25 mol/L, the concentration of free nitric acid is 0.40 mol/L, and the molar ratio of thorium to total rare earth elements is 1:4.

11. The method of claim 1, wherein, in step (3), the washing solution is hydrochloric acid, nitric acid, or sulfuric acid at a concentration of 0.1-1.0 mol/L.

12. The method of claim 1, wherein, in step (4), the back-extraction solution is hydrochloric acid, nitric acid, or sulfuric acid at a concentration of 2.0-6.0 mol/L.

13. The method of claim 1, wherein, in step (2), a volume ratio of the organic phase to the stock solution is 0.1:1 to 2:1.

14. The method of claim 1, wherein the extraction process is carried out in a plurality of mixer settlers, containing n-stage extraction, m-stage washing, and j-stage back-extraction, wherein n=4-6, m=5-8, and j=4-6.

15. The method of claim 1, wherein, in formula (I), $R_1$ and $R_2$ are the same or different, and are each independently a $C_6$-$C_{12}$ branched alkyl.

16. The method of claim 1, wherein, in formula (II), $R_3$ and $R_4$ are the same or different, and are each independently selected from the group consisting of $C_3$-$C_{20}$ linear and branched alkyls.

17. The method of claim 1, wherein, in the extractant, the volume percentages of alkyl phosphonic acid monoalkyl ester and dialkylphosphinic acid are 30-90 vol % and 10-70 vol %, respectively.

18. The method of claim 1, wherein, a ratio of the mass in kilograms of the rare earth waste residues to the volume in liters of the inorganic acid is 1:1-8.

19. The method of claim 1, wherein, in the stock solution, the total concentration of rare earth elements is 0.1-0.5 mol/L.

20. The method of claim 1, wherein the washing solution is 0.5 mol/L hydrochloric acid, 0.3 mol/L sulfuric acid, or 0.5 mol/L nitric acid.

* * * * *